United States Patent
Berry et al.

(10) Patent No.: US 12,296,693 B2
(45) Date of Patent: May 13, 2025

(54) SYSTEM AND METHOD FOR TEMPERATURE ESTIMATION OF INVERTER AC POWER BUS

(71) Applicant: GM GLOBAL TECHNOLOGY OPERATIONS LLC, Detroit, MI (US)

(72) Inventors: Daniel J. Berry, Macomb Township, MI (US); Young J. Kim, Troy, MI (US); Dylan M. Day, Auburn Hills, MI (US); Jeffrey W. Yambor, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 181 days.

(21) Appl. No.: 18/350,890

(22) Filed: Jul. 12, 2023

(65) Prior Publication Data

US 2025/0018807 A1    Jan. 16, 2025

(51) Int. Cl.
*H02P 27/04* (2016.01)
*B60L 50/51* (2019.01)
*H02P 27/08* (2006.01)

(52) U.S. Cl.
CPC ............ *B60L 50/51* (2019.02); *H02P 27/08* (2013.01); *B60L 2240/36* (2013.01)

(58) Field of Classification Search
CPC ................................ H02P 50/51; B60L 27/08
USPC ........................................................ 318/801
See application file for complete search history.

(56) References Cited

U.S. PATENT DOCUMENTS

| 2013/0021749 | A1* | 1/2013 | Nakajima | H05K 7/20927 361/689 |
| 2013/0175612 | A1* | 7/2013 | Tai | H10D 30/668 257/334 |
| 2017/0175612 | A1* | 6/2017 | Tokozakura | F01P 7/14 |
| 2022/0196483 | A1 | 6/2022 | Kobayashi et al. | |
| 2022/0271628 | A1* | 8/2022 | Miki | H02K 11/25 |

FOREIGN PATENT DOCUMENTS

| DE | 102011075605 A1 | 3/2012 |
| DE | 102023102747 A1 | 8/2023 |

OTHER PUBLICATIONS

German Office Action dated Apr. 30, 2024.

* cited by examiner

*Primary Examiner* — Erick D Glass
(74) *Attorney, Agent, or Firm* — Quinn IP Law

(57) ABSTRACT

A system for controlling operation of a vehicle having a power inverter module includes an alternating current (AC) power bus coupled to the power inverter module. The AC power bus has a plurality of busbars for conducting an AC current having multiple phases. The AC power bus is coupled to a stator in an electric motor configured to generate torque to propel the vehicle. A controller is adapted to determine an estimated temperature of the AC power bus for the multiple phases based on a plurality of factors. The plurality of factors includes an oil flow rate of a motor oil and a coolant flow rate of an inverter coolant that are in respective direct or indirect thermal contact with the plurality of busbars. The controller is adapted to control operation of the vehicle based in part on a highest one of the estimated temperature of the multiple phases.

20 Claims, 5 Drawing Sheets

SYSTEM AND METHOD FOR TEMPERATURE ESTIMATION OF INVERTER AC POWER BUS

INTRODUCTION

The disclosure relates generally to a system for controlling operation of a vehicle having a power inverter module. More specifically, the disclosure relates to determining an estimated temperature for an alternating current (AC) power bus coupled to the power inverter module. Hybrid and electric vehicles generally include an AC electric motor which is driven by a direct current (DC) power source, such as a rechargeable battery. The stator windings of the electric motor may be coupled to a power inverter that converts the DC power to AC power for driving the electric motor. The electric motor is employed to power the drive system of the hybrid and electric vehicle. The AC power bus and its associated components may present thermal limitations for some operating conditions of the drive system. However, the drive system may not have physical sensors on the AC power bus and its associated components to monitor temperatures.

SUMMARY

Disclosed herein is a system for controlling operation of a vehicle having a power inverter module. The system includes an alternating current (AC) power bus coupled to the power inverter module. The AC power bus has a plurality of busbars for conducting an AC current having multiple phases. An electric motor is configured to generate torque to propel the vehicle. The AC power bus is coupled to a stator in the electric motor. An inverter coolant and motor oil are in respective direct or indirect thermal contact with the plurality of busbars. The system includes a controller adapted to determine an estimated temperature of the AC power bus for each of the multiple phases based on a plurality of factors, the controller having a processor and tangible, non-transitory memory on which instructions are recorded. The plurality of factors includes an oil flow rate of the motor oil and a coolant flow rate of the inverter coolant. The controller is adapted to control operation of the vehicle based in part on a highest one of the estimated temperature of the multiple phases (e.g., in a system with three phases, the estimated temperature that is highest amongst the three phases).

In some embodiments, a common-mode choke is in thermal communication with the plurality of busbars. The plurality of factors may include an estimated choke heat for the common-mode choke, the estimated choke heat being based in part on a switching frequency, a modulation index, and a PWM type of the power inverter module. The estimated choke heat ($Q_{choke}$) for each of the multiple phases may be obtained as:

$$Q_{choke} = \left[ Q_{base} * \frac{f_{sw}}{K_{fsw}} * K_{PWM} * K_{MI} \right].$$

Here $Q_{base}$ is a calibratable value for base heat loss, $f_{sw}$ is the switching frequency, $K_{fsw}$ is a calibratable scalar value for the switching frequency, and $K_{MI}$, $K_{PWM}$ are respective calibratable values based on the modulation index and PWM type, respectively.

Controlling operation of the vehicle may include determining an inverter capability of the power inverter module based in part on the estimated temperature, and derating the torque based in part on the inverter capability. The vehicle may include a secondary inverter, controlling operation of the vehicle including load sharing with the secondary inverter based in part on the inverter capability.

In some embodiments, determining the estimated temperature of the AC power bus may include initializing to a starting temperature for each of the multiple phases. The starting temperature may be based in part on a key-off temperature of the AC power bus at a vehicle shutdown, an elapsed time between the vehicle shutdown and a vehicle restart, a calibratable time constant for the AC power bus and a projected cool-down temperature for the AC power bus.

In some embodiments, the starting temperature ($T_{ACBB}$) of the AC power bus is obtained as: $T_{ACBB}=[T_{Cint}+(T_{Keyoff}-T_{Cint})*e^{-t_{inactv}*\tau}]$. Here $T_{KeyOff}$ is the key-off temperature of the AC power bus when the vehicle was shutdown, $t_{inactv}$ is the elapsed time between a vehicle shutdown and a vehicle restart, $\tau$ is the calibratable time constant for the AC power bus, and $T_{Cint}$ is the projected cool-down temperature for the AC power bus.

The plurality of factors may include respective electrical resistances of the plurality of busbars, the respective electrical resistances being based on a respective calibratable nominal electrical resistance of the plurality of busbars at 25 C ($R_{25C}$), the starting temperature ($T_{ACBB}$), and a temperature coefficient of copper.

In some embodiments, the plurality of factors includes a respective heat flow between the AC power bus and reference components for each of the multiple phases, the respective heat flow ($Q_{ref}$) being obtained as: $Q_{ref}=[T_{ref}-T_{ACBB}]*K_{ref}$. Here $T_{ref}$ denotes a respective temperature of the reference components, $T_{ACBB}$ denotes the respective temperature of the plurality of busbars, and $K_{ref}$ denotes a respective thermal conductivity of the reference components. The reference components may include the stator, the power inverter module, the motor oil, and the inverter coolant.

In some embodiments, the plurality of factors includes respective electrical losses of the plurality of busbars, the respective electrical losses ($P_{loss}$) being based in part on a speed ($N_{Mtr}$) of the electric motor in RPM, and a calibratable speed threshold ($N_{Thrs}$) for determining if the electric motor is in a stall operation. The respective electrical losses may be based on a root-mean-square current ($I_{RMS}$) when the electric motor is in a non-stall operation and individual phase currents ($I_{abc}$) when the electric motor is in a stall operation.

Disclosed herein is a method of operating a vehicle having a power inverter module, an electric motor configured to generate torque, and a controller having a processor and tangible, non-transitory memory. The method includes coupling an alternating current (AC) power bus to the power inverter module, the AC power bus having a plurality of busbars for conducting an AC current having multiple phases. The AC power bus is coupled to a stator in the electric motor. The method includes positioning the plurality of busbars to be in respective thermal contact with an inverter coolant and motor oil. The method includes determining an estimated temperature of the AC power bus for each of the multiple phases of the AC current based on a plurality of factors, the plurality of factors including an oil flow rate of the motor oil and a coolant flow rate of the inverter coolant. Controlling operation of the vehicle may be based in part on a highest one of the estimated temperature for the multiple phases.

The above features and advantages and other features and advantages of the present disclosure are readily apparent from the following detailed description of the best modes for carrying out the disclosure when taken in connection with the accompanying drawings.

Figure 1:
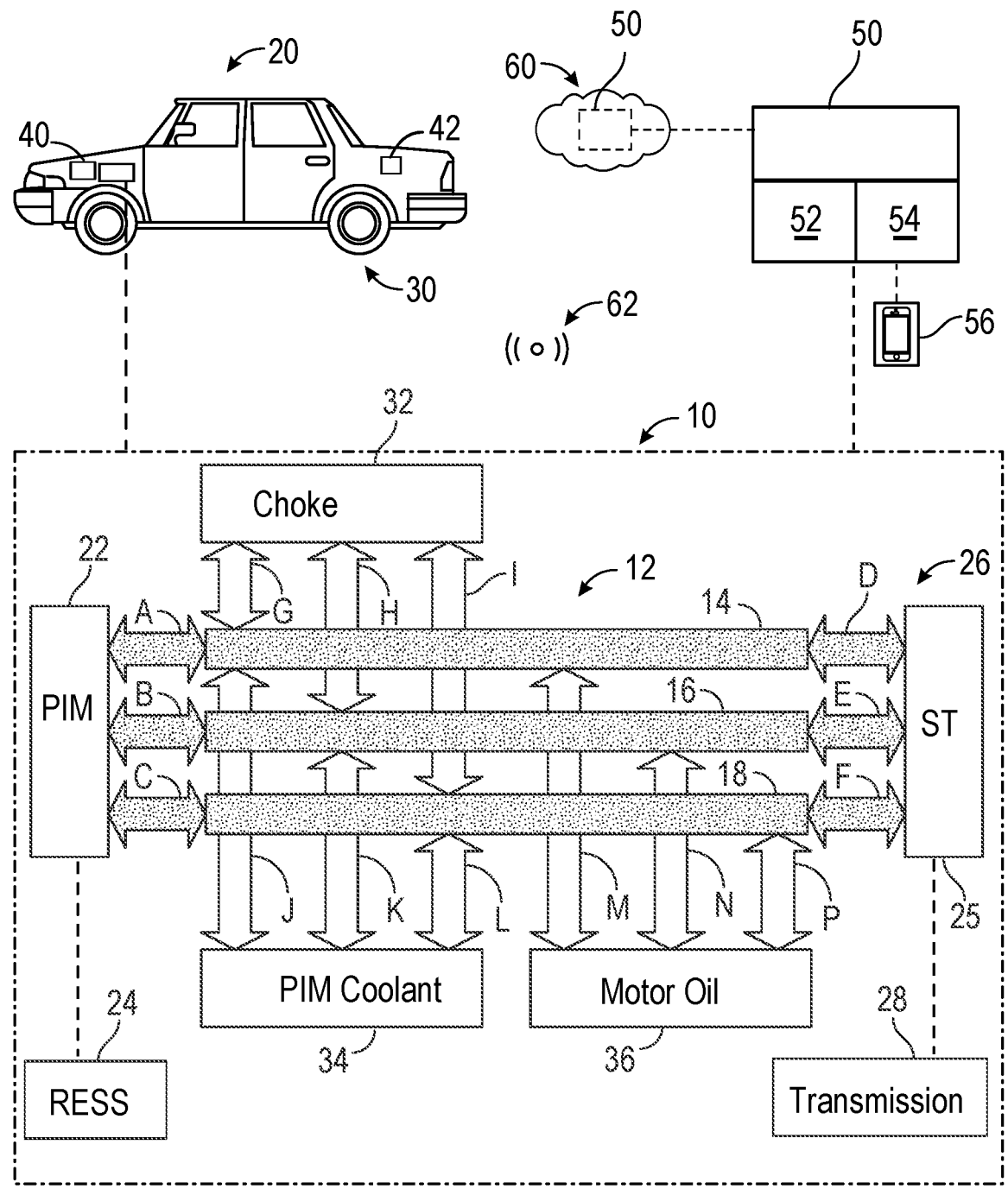
FIG. 1 is a schematic diagram of a system for a vehicle having a power inverter, an electric motor, and a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 having an AC power bus 12. The AC power bus 12 is composed of a plurality of busbars, such as a first busbar 14, a second busbar 16, and a third busbar 18. The AC power bus 12 may be part of a vehicle 20 which may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train, or another moving platform. The vehicle 20 may be fully or partially electric. It is to be understood that the vehicle 20 may take many different forms and have additional components.

The AC power bus 12 acts as a junction for receiving and transmitting electrical power and heat. FIG. 1 illustrates the reception and transmission of electrical power and heat through the AC power bus 12 through a number of bi-directional arrows. Arrows A, B, C, D, E, F (shown shaded) denote AC power and heat flow. Arrows G, H, I, J, K, L, M, N, P denote heat flow.

Referring to FIG. 1, the system 10 includes a power inverter module (PIM) 22, a rechargeable energy storage system (RESS) 24, an electric motor (EM) 26, and a transmission 28. The power inverter module 22 receives or returns DC voltage from or to the rechargeable energy storage system 24 (e.g., a high voltage battery) and is operable for inverting a DC voltage to an AC voltage and vice versa as needed, e.g., in response to pulse width modulation signals. Arrows A, B, C show the bi-directional flow of electrical power and heat between the power inverter module 22 and the AC power bus 12 (the first busbar 14, the second busbar 16, and third busbar 18 respectively).

The AC voltage is transmitted to the stator 25 of the electric motor 26, via the AC power bus 12. The AC power bus 12 is connected to individual phase windings of the electric motor 26. Arrows D. E. F show the bi-directional flow of electrical power and heat between the electric motor 26 and the AC power bus 12 (the first busbar 14, the second busbar 16, and third busbar 18 respectively). The energized electric motor 26 delivers mechanical power or torque to an input member of the transmission 28, with output torque transferred to an output member of the transmission 28, and finally to drive wheels 30, via one or more drive axles (not shown).

The AC power bus 12 and its associated components such as sensors, insulators, and seals may present thermal limit for many operating conditions of an electric drive system. The temperature of an AC power bus 12 is dependent on numerous factors, including internal heating losses due to electrical power transmitted through the AC power bus 12, electrical resistance, and external heat transmitted to or from associated mating or nearby components, such as fluids used for cooling. Because of the complexity and number of sources, it is not a trivial matter to obtain the temperatures of each component.

The system 10 enables estimation temperature of an AC power bus 12 over a wide range of applications and operating profiles. Referring to FIG. 1, the system 10 includes a controller 50 having at least one processor 52 and at least one memory 54 (or non-transitory, tangible computer readable medium) on which instructions may be recorded for a method 100, described below and shown in FIGS. 2-3, of operating the system 10. The memory 54 can store controller-executable instruction sets, and the processor 52 can execute the controller-executable instruction sets stored in the memory 54.

Referring to FIG. 1, a common-mode choke 32 ("choke" hereinafter) may be associated with the AC power bus 12. The choke 32 is adapted to filter common mode currents and may act as a source of heat. The choke 32 is in thermal communication with each component of the AC power bus 12, as indicated by arrows G, H, I. The controller 50 is adapted to selectively execute a choke heat estimator 200, described below with respect to FIG. 4, for determining an estimated temperature of the choke heat.

The AC power bus 12 also interacts with a PIM coolant 34, as shown by arrows J, K, L, and motor oil 36 as shown by arrows M, N, P. Referring to FIG. 1, the vehicle 20 may include one or more secondary inverters 40 and a secondary torque source 42 (e.g., an internal combustion engine). The secondary torque source 42 is configured to selectively provide a secondary torque contribution to propel the vehicle 20, through the wheels 30, for example.

By estimating the temperature of the AC power bus 12, the system enables potential derating and load sharing, e.g., thermally balance loads between different inverters (e.g., secondary inverter 40) in multi-drive applications and/or employing the secondary torque source 42. This allows for increased vehicle capability as the load may be shifted to a propulsion system that is at less risk of derating in order in order to maintain vehicle speed under high AC current conditions. Specifically, this feature may be used to support heavy use profiles with high and/or sustained AC currents such as towing, repeated wide-open-throttle accelerations, and holding the vehicle 20 on grade using torque from the tractive motors.

Figure 2:
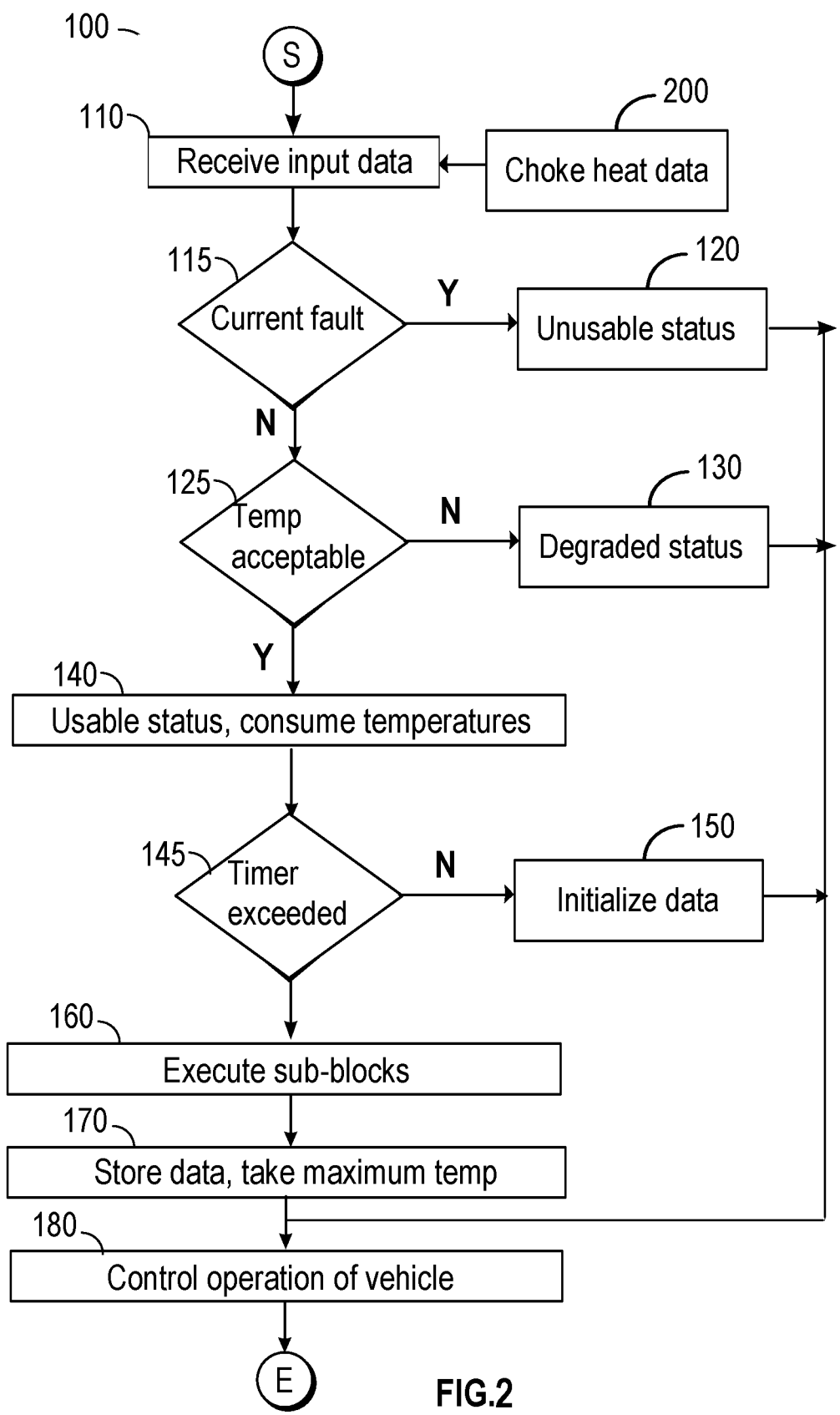
FIG. 2 is a flowchart for a method executable by the controller of FIG. 1.

Referring now to FIG. 2, an example flowchart of the method 100 is shown. Method 100 may be embodied as computer-readable code or instructions stored on and partially executable by the controller 50 of FIG. 1. Method 100 need not be applied in the specific order recited herein and may be dynamically executed. Furthermore, it is to be understood that some steps may be eliminated.

Per block 110, the method 100 includes receiving input data, such as the motor speed, oil flow rate, phase currents, and temperatures of surrounding components. The input data includes an estimated choke heat generated by a choke heat estimator 200 described below with respect to FIG. 4. For a particular AC power bus design, the input data may be obtained through physical sensors, finite element analysis, numerical simulation, and other methods available to those skilled in the art.

Advancing to block 115, the controller 50 is adapted to determine if there is a fault in the motor current. If so (block 115=YES), the method 100 proceeds to block 120 where the estimator status is set to unusable, the phase temperature is 0° C. and the AC busbar losses are set to zero.

If not (block 115=NO), the method 100 proceeds to block 125 where the controller 50 is adapted to determine if the reference temperatures available for surrounding components (e.g., stator 25 of electric motor 26, power inverter module 22, motor oil 36, and PIM coolant 34) are acceptable. These temperatures may be obtained by sensors or estimated through other ways. If the reference temperatures are not acceptable (block 125=NO), the method 100 proceeds to block 130 where the controller 50 is adapted to set a predefined degraded temperature and set the estimated status to "degraded."

If the reference temperatures are acceptable (block 125=YES), the method 100 proceeds to block 140 where the controller 50 is adapted to update the temperatures and set the estimator status as "usable." Advancing from block 140 to block 145, the controller 50 is adapted to determine if a delay timer initiated at the beginning of the cycle (when the vehicle 20 started) is greater than or equal to a calibrated delay threshold. In one example, the calibrated delay threshold is set to about 2 seconds.

If not (block 145=NO), the method 100 proceeds to block 150 where the controller 50 is adapted to initialize the AC bus temperature to a starting temperature ($T_{ACBB}$) which may be calculated per phase based on the temperature ($T_{KeyOff}$) of the AC power bus 12 when the vehicle 20 was shutdown, how much time ($t_{inactv}$) has passed between vehicle shutdown and restart, a calibratable time constant ($\tau$) for the AC power bus 12 and the reference temperature ($T_{Cint}$) that the AC power bus 12 would be cooling down towards. In one example, the starting temperature ($T_{ACBB}$) of the AC power bus 12 is obtained as: $T_{ACBB}=[T_{Cint}+(T_{Keyoff}-T_{Cint})*e^{-t_{inactv}*\tau}]$.

Figure 3:
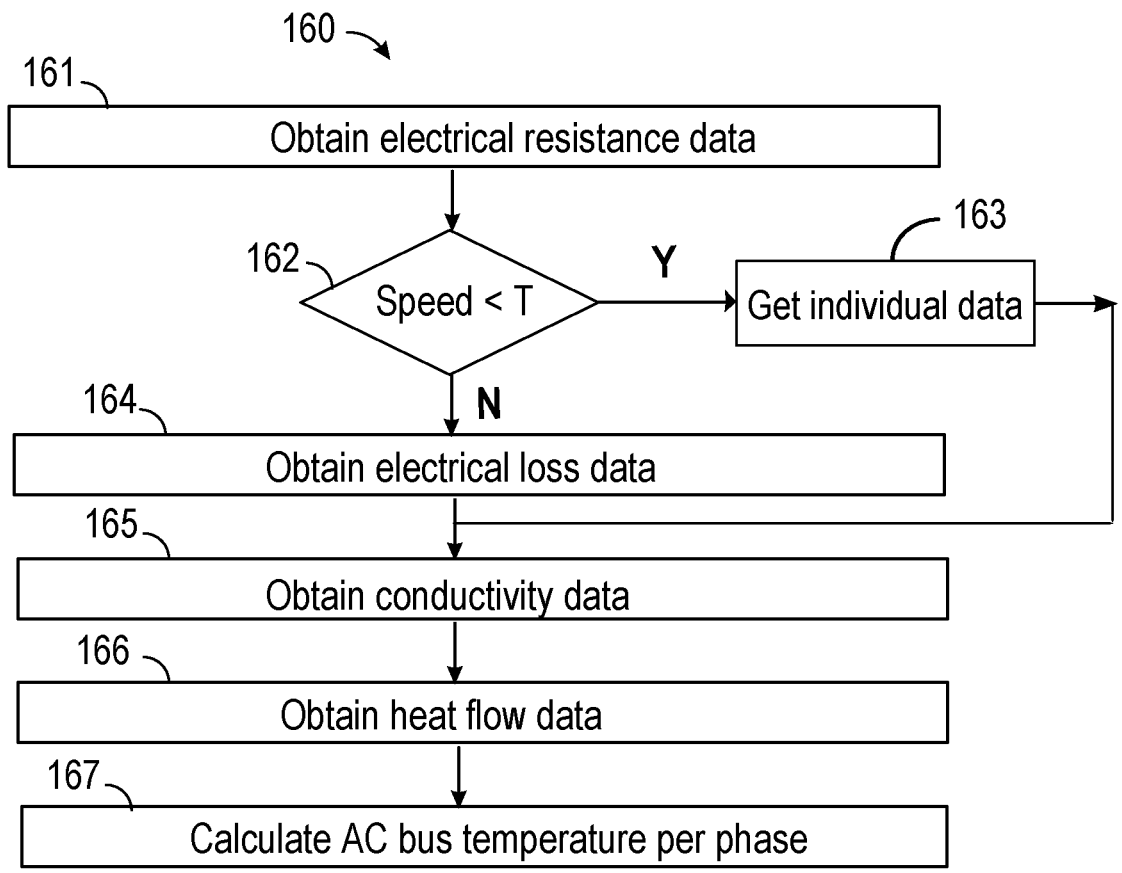
FIG. 3 is a flowchart of a portion of the method of FIG. 2.

If so (block 145=YES), the method 100 proceeds to block 160, which includes subblocks 161 through to 167, shown in FIG. 3. Referring now to FIG. 3, per subblock 161, the controller 50 is adapted to calculate the per phase busbar electrical resistances as a function of the estimated bus temperature. The temperature-scaled electrical resistance ($R_{elec}$) of the AC power bus 12 may be obtained as a function of a calibratable nominal electrical resistance at 25 C ($R_{25C}$), the estimated temperature ($T_{ACBB}$), and the temperature coefficient of copper ($K_{CU}$)

$$\left(0.393 \frac{\%}{C}\right).$$

This calculation is done separately for each of the three phases, as $R_{25C}$ may change for each phase of the busbar: $R_{elec}=[R_{25C}*(1+K_{CU}*(T_{ACBB}-25))]$.

Proceeding to subblock 162 of FIG. 3, the controller 50 is adapted to determine if the motor speed is less than or equal to a threshold. If so (subblock 162=YES), the method 100 proceeds to subblock 163, where the controller 50 is adapted to calculate the busbar electrical loss per phase as a function of individual phase currents doing stall.

If not (subblock 162=NOT), the method 100 proceeds to subblock 164 where the controller 50 is adapted to calculate the busbar electrical loss per phase. The electrical loss ($P_{loss}$) or heat loss of the AC power bus 12 may be calculated per phase based in part on the speed ($N_{Mtr}$) of the electric motor 26 in RPM and a calibratable speed threshold ($N_{Thrs}$) that determines whether the electric motor 26 is in stall. If during stall the individual phase currents ($I_{abc}$) are used with the corresponding electrical resistance per phase (i.e. power loss of phase A=Ia*Ia*Ra and power loss of phase B=Ib*Ib*Rb). The electrical loss ($P_{loss}$) is shared with the subblocks 162 and 163. The electrical loss ($P_{loss}$) may be obtained as:

$$P_{loss} = \begin{cases} (I_{abc})^2 * R_{elec}, & N_{Mtr} < N_{Thrs} \\ (I_{RMS})^2 * R_{elec}, & N_{Mtr} \geq N_{Thrs} \end{cases}$$

Advancing to subblock 165 from subblock 164 as well as subblock 163, the controller 50 is adapted to obtain conductivity data, including the per phase thermal conductivity between the AC power bus 12 and the motor oil 36. The per phase thermal conductivity ($K_{Oil\_ACBB}$) of the motor oil 36 is a function of the oil flow rate and may be determined using a look-up table e.g., $K_{Oil\_ACBB}(dV)=LUT(dV)$ where dV is the flow rate.

Advancing to subblock 166 of FIG. 3, the controller 50 may be adapted to calculate the per phase heat flow between the AC power bus 12 and each reference component (e.g., stator 25 of electric motor 26, power inverter module 22, motor oil 36, and PIM coolant 34) as a function of the thermal conductivity. The per phase heat flow may be represented as:

$$Q_{ref} = [T_{ref} - T_{ACBB}] * K_{ref}$$

Here $Q_{ref}$ and $T_{ref}$ denote the respective heat flow and temperature of each reference component, $T_{ACBB}$ is the temperature of the AC busbars and $K_{ref}$ denotes the thermal conductivity. The total per phase heat flow between the AC busbars, self-heating and other components is represented as the sum of the calculated heats:

$$Q_{Total} = Q_{Loss} + Q_{Choke} + Q_{PIM} + Q_{Stator} + Q_{Oil} + Q_{Coolant}$$

Finally per subblock 167, the temperature of the AC power bus 12 per phase may be determined as a function of the total heat flow, the busbar temperature at the previous time instance, the calibratable mCp (mass*specific heat) of the busbar, and a time step N as follows:

$$mCp\left(\frac{W}{C}\right) = \text{mass} * \text{specific heat} = \frac{\Delta Q(W)}{\Delta T(C)} \rightarrow \Delta T(C) = \frac{\Delta Q(W)}{mCp\left(\frac{W}{C}\right)} = \frac{dT}{dt};$$

$$T_N = T_{N-1} + \Delta t * \frac{dT}{dt} = T_{N-1} + \Delta t * \frac{\Delta Q}{mCp}$$

Referring back to FIG. 2, the method 100 advances to block 170 from block 160, where the controller 50 is adapted to store the key off AC bus temperatures and other data, including the maximum of the estimated temperature of the three phases. The maximum one of the estimated temperatures from the three phases is set as the estimated temperature of the AC power bus 12. Proceeding to block 180, operation of the vehicle 20 (via the system 10) is controlled based on the estimated temperature. The estimated temperature is employed in the rating and load sharing algorithms, such as through the supervisory controller 340 shown in FIG. 5 and described below. Controlling operation of the vehicle 20 includes optimally balancing thermal loads between different components based on the estimated temperature of the AC power bus 12 (from block 170), such as re-proportioning to one or more secondary inverters 40 or generating torque through a secondary torque source 42.

Figure 5:
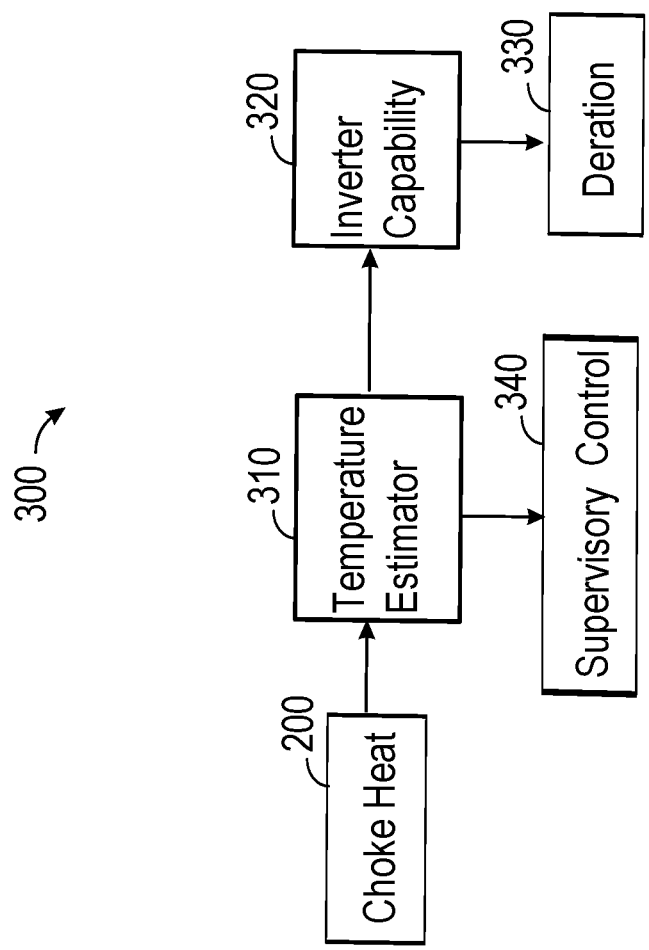
FIG. 5 is a schematic diagram of an example architecture employable by the system of FIG. 1.

An example architecture 300 employable by the system 10 is shown in FIG. 5. It is to be understood that other types of layouts or arrangements may be employed. The choke heat estimator or module 200 receives the following parameters as input: the switching frequency, modulation index, and PWM type. Referring to FIG. 5, the choke heat estimator 200 calculates the choke heat per phase and transmits it to a temperature estimator 310. The temperature estimator 310 also receives as input the phase, d-q-axis currents, external temperatures, oil flow rate, and motor speed. The temperature estimator 310 and the choke heat estimator 200 employ both measured variables as well as estimations and may be optimized with consideration of accuracy versus complexity. The temperature estimator 310 may accommodate an unlimited number of external heat sources and/or sinks with individually calibratable thermal resistances.

Referring to FIG. 1, the temperature estimator 310 generates an estimated AC bus temperature, which is sent as output to the inverter capability module 320, along with the estimator status. The inverter capability module 320 calculates the inverter capability based on the estimated AC bus temperature. The output of the inverter capability module 320 is sent to a deration module 330 that is adapted to derate the motor torque based on inverter capability and the temperature limits.

As noted above, the temperature output of the temperature estimator 310 may be used by supervisory controls, which have information regarding the temperature limits of the AC power bus 12, in order to transfer torque demand from an inverter that is approaching its temperature limit to one that is not. Referring to FIG. 5, the output of the temperature estimator 310 may also be transmitted to a supervisory controller 340 which is adapted to assess the probability of the system 10 reaching its thermal limit. Based on this, the supervisory controller 340 may reprioritize strategies to prevent derating of system power due to temperature, e.g., re-proportioning torque to other drive systems in the vehicle 20.

Figure 4:
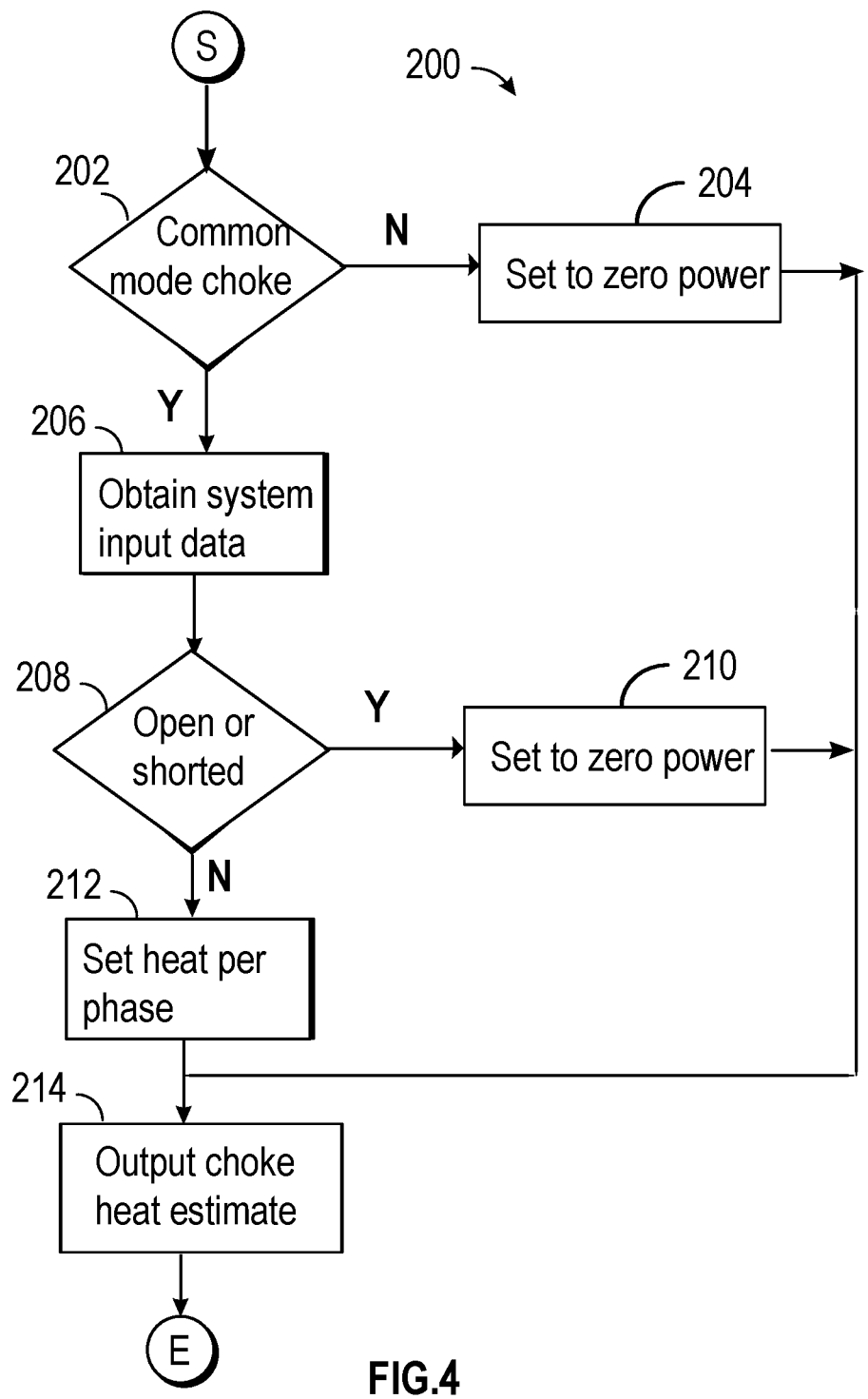
FIG. 4 is a flowchart for another method executable by the controller of FIG. 1.

Referring now to FIG. 4, an example flowchart of the choke heat estimator 200, referred to herein as module 200, is shown. Module 200 may be embodied as computer-readable code or instructions stored on and partially executable by the controller 50 of FIG. 1. Module 200 need not be applied in the specific order recited herein and may be dynamically executed. It is to be understood that some steps may be eliminated.

Beginning at block 202 of FIG. 4, the controller 50 is adapted to determine if the system 10 includes a common-mode choke 32. If not (block 202=NO), the module 200 proceeds to block 204 where the controller 50 is adapted to set the estimated choke heat to zero. If so (block 202=YES), the module 200 proceeds to block 206 where the controller 50 is adapted to retrieve input data, including PWM type, switching, frequency, and modulation index. Advancing to block 208, the controller 50 is adapted to determine if the power stage is open or shorted.

If the power stage is open or shorted (block 208=YES), the module 200 proceeds to block 210 where the controller 50 is adapted to set the estimated choke heat to zero. If the power stage is not open or shorted (block 212=YES), the module 200 proceeds to block 212 where the controller 50 is adapted to determine the per phase AC choke heat as a function of PWM type, switching frequency and modulation index. In one embodiment, the estimated choke heat ($Q_{choke}$) per phase may be obtained as:

$$Q_{choke} = \left[Q_{base} * \frac{f_{sw}}{K_{fsw}} * K_{PWM} * K_{MI}\right].$$

Here $Q_{base}$ is a calibratable value for base heat loss, $f_{sw}$ is a switching frequency, $K_{fsw}$ is a calibratable scalar value for switching frequency, and $K_{MI}$, $K_{PWM}$ are respective calibratable values based on the modulation index (MI) and PWM, respectively. $K_{MI}$, $K_{PWM}$ may be obtained as shown below:

$$K_{MI} = \begin{cases} \left(\frac{1-Y_{MI}}{X_{MI}} * MI\right) + Y_{MI}, & MI < X_{MI} \\ 1, & MI \geq X_{MI} \end{cases}$$

$$K_{PWM} = \begin{cases} K_{SVPWM}, & \text{PWM Type is SVPWM} \\ 1, & \text{PWM Type is not SVPWM} \end{cases}$$

Here $K_{SVPWM}$ is a calibratable scalar determined by PWM type. Here $Y_{MI}$ is the calibratable y-intercept of a piecewise linear slope, $X_{MI}$ is the calibratable MI threshold of the piecewise linear function and $K_{MI}$ is a predetermined scalar value. Advancing to block 214, the estimated choke heat is transmitted to the temperature estimator 310, shown in FIG. 5 and the module 200 ends.

Referring to FIG. 1, the vehicle 20 may include a mobile application 56 embedded in a smart device (e.g., smart phone), which may be plugged in or otherwise linked to the vehicle 20. The mobile application 56 may be employed to execute various parts of the method 100 described above. The circuitry and components of a mobile application ("apps") available to those skilled in the art may be employed.

In one embodiment, the controller 50 of FIG. 1 is embedded in the vehicle 20. In another embodiment, the controller 50 may be hosted or based out of a remotely located cloud computing service 60. The cloud computing service 60 may include one or more remote servers hosted on the Internet to store, manage, and process data. The cloud computing service 60 may be at least partially managed by personnel at various locations.

The system 10 may employ a wireless network 62 for communications between the various components. The wireless network 62 may be a short-range network or a long-range network. The wireless network 62 may be a communication BUS, which may be in the form of a serial Controller Area Network (CAN-BUS). The wireless network 62 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The wireless network 62 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

In summary, the system 10 allows for operation control based on temperature feedback on the AC power bus 12. Excessive loads are minimized as the controller 50 is adapted to derate power through the system 10 and/or employ load-sharing. Specifically, this feature may improve towing capability in electric vehicle trucks.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The controller 50 of FIG. 1 may be an integral portion of, or a separate module operatively connected to, other controllers of the vehicle 20. The controller 50 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts shown in the FIGS. illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling operation of a vehicle having a power inverter module, comprising:
   an alternating current (AC) power bus coupled to the power inverter module, the AC power bus having a plurality of busbars for conducting an AC current having multiple phases;

an electric motor configured to generate torque to propel the vehicle, the AC power bus being coupled to a stator in the electric motor;

an inverter coolant and motor oil in respective direct or indirect thermal contact with the plurality of busbars;

a controller adapted to determine an estimated temperature of the AC power bus for each of the multiple phases based on a plurality of factors, the controller having a processor and tangible, non-transitory memory on which instructions are recorded;

wherein the plurality of factors includes an oil flow rate of the motor oil and a coolant flow rate of the inverter coolant; and wherein the controller is adapted to control operation of the vehicle based in part on a highest one of the estimated temperature of the multiple phases.

2. The system of claim 1, further comprising:

a common-mode choke in thermal communication with the plurality of busbars; and wherein the plurality of factors includes an estimated choke heat for the common-mode choke, the estimated choke heat being based in part on a switching frequency, a modulation index, and a PWM type of the power inverter module.

3. The system of claim 2:

wherein the estimated choke heat ($Q_{choke}$) for each of the multiple phases may be obtained as:

$$Q_{choke} = \left[Q_{base} * \frac{f_{sw}}{K_{fsw}} * K_{PWM} * K_{MI}\right];$$

and wherein $Q_{base}$ is a calibratable value for base heat loss, $f_{sw}$ is the switching frequency, $K_{fsw}$ is a calibratable scalar value for the switching frequency, and $K_{MI}$, $K_{PWM}$ are respective calibratable values based on the modulation index and PWM type, respectively.

4. The system of claim 1, wherein controlling operation of the vehicle includes determining an inverter capability of the power inverter module based in part on the estimated temperature, and derating the torque based in part on the inverter capability.

5. The system of claim 4, wherein the vehicle includes a secondary inverter, controlling operation of the vehicle including load sharing with the secondary inverter based in part on the inverter capability.

6. The system of claim 1:

wherein determining the estimated temperature of the AC power bus includes initializing to a starting temperature for each of the multiple phases; and wherein the starting temperature based in part on a key-off temperature of the AC power bus at a vehicle shutdown, an elapsed time between the vehicle shutdown and a vehicle restart, a calibratable time constant for the AC power bus and a projected cool-down temperature for the AC power bus.

7. The system of claim 6:

wherein the starting estimated temperature ($T_{ACBB}$) of the AC power bus is obtained as: $T_{ACBB}=[T_{Cint}+(T_{KeyOff}-T_{Cint})*e^{-t_{inactv}*\tau}]$; and wherein $T_{KeyOff}$ is the key-off temperature of the AC power bus when the vehicle was shutdown, $t_{inactv}$ is the elapsed time between a vehicle shutdown and a vehicle restart, t is the calibratable time constant for the AC power bus, and $T_{CInt}$ is the projected cool-down temperature for the AC power bus.

8. The system of claim 1, wherein the plurality of factors includes respective electrical resistances of the plurality of busbars, the respective electrical resistances being based on a respective calibratable nominal electrical resistance of the plurality of busbars at 25 C ($R_{25C}$), the estimated temperature ($T_{ACBB}$), and a temperature coefficient of copper.

9. The system of claim 1:

wherein the plurality of factors includes a respective heat flow between the AC power bus and reference components for each of the multiple phases, the respective heat flow ($Q_{ref}$) being obtained as: $Q_{ref}=[T_{ref}-T_{ACBB}]*K_{ref}$; and wherein $T_{ref}$ denotes a respective temperature of the reference components, $T_{ACBB}$ denotes the respective temperature of the plurality of busbars, and $K_{ref}$ denotes a respective thermal conductivity of the reference components.

10. The system of claim 9, wherein the reference components include the stator, the power inverter module, the motor oil, the inverter coolant, and a common-mode choke in thermal communication with the plurality of busbars.

11. The system of claim 1, wherein the plurality of factors includes respective electrical losses of the plurality of busbars, the respective electrical losses ($P_{loss}$) being based in part on a speed ($N_{Mtr}$) of the electric motor in RPM, and a calibratable speed threshold ($N_{Thrs}$) for determining if the electric motor is in a stall operation.

12. The system of claim 11, wherein the respective electrical losses are based on a root-mean-square current ($I_{RMS}$) when the electric motor is in a non-stall operation and individual phase currents ($I_{abc}$) when the electric motor is in the stall operation.

13. A method of operating a vehicle having a power inverter module, an electric motor configured to generate torque, and a controller having a processor and tangible, non-transitory memory, the method comprising:

coupling an alternating current (AC) power bus to the power inverter module, the AC power bus having a plurality of busbars for conducting an AC current having multiple phases;

coupling the AC power bus to a stator in the electric motor;

positioning the plurality of busbars to be in respective thermal contact with an inverter coolant and motor oil;

determining an estimated temperature of the AC power bus for each of the multiple phases of the AC current based on a plurality of factors, the plurality of factors including an oil flow rate of the motor oil and a coolant flow rate of the inverter coolant; and controlling operation of the vehicle based in part on a highest one of the estimated temperature for the multiple phases.

14. The method of claim 13, further comprising:

determining an inverter capability based in part on the temperature estimate, wherein controlling operation of the vehicle includes derating of the torque based in part on the inverter capability.

15. The method of claim 13, further comprising:

incorporating a secondary source in the vehicle for selectively providing a secondary torque contribution to propel the vehicle, wherein controlling operation of the vehicle includes load sharing with the secondary source.

16. The method of claim 13, further comprising:
coupling a common-mode choke for thermal communication with the plurality of busbars, the plurality of factors includes an estimated choke heat for the common-mode choke; and
obtaining the estimated choke heat based in part on a PWM type, a switching frequency and a modulation index of the power inverter module.

17. The method of claim 16, further comprising:
determining the estimated choke heat ($Q_{choke}$) for each of the multiple phases may be obtained as:

$$Q_{choke} = \left[ Q_{base} * \frac{f_{sw}}{K_{fsw}} * K_{PWM} * K_{MI} \right],$$

wherein $Q_{base}$ is a calibratable value for base heat loss, $f_{sw}$ is the switching frequency, $K_{fsw}$ is a calibratable scalar value for the switching frequency, and $K_{MI}$, $K_{PWM}$ are respective calibratable values based on the modulation index and PWM type, respectively.

18. The method of claim 13, further comprising:
determining the estimated temperature of the AC power bus based on a starting temperature for each of the multiple phases; and
determining the starting temperature based in part on a key-off temperature of the AC power bus at a vehicle shutdown, an elapsed time between the vehicle shutdown and a vehicle restart, a calibratable time constant for the AC power bus and a projected cool-down temperature for the AC power bus.

19. The method of claim 13, further comprising:
incorporating respective electrical losses of the plurality of busbars, in the plurality of factors, the respective electrical losses ($P_{loss}$) being based in part on a speed ($N_{Mtr}$) of the electric motor in RPM, and a calibratable speed threshold ($N_{Thrs}$) for determining if the electric motor is in a stall operation.

20. A motor vehicle comprising:
a rechargeable energy storage system (RESS);
a power inverter module adapted to receive DC voltage from the RESS;
an alternating current (AC) power bus coupled to the power inverter module, the AC power bus having a plurality of busbars for conducting an AC current having multiple phases;
an electric motor configured to generate torque to propel the vehicle, the AC power bus being coupled to a stator in the electric motor;
an inverter coolant and motor oil in respective direct or indirect thermal contact with the plurality of busbars;
a controller adapted to determine an estimated temperature of the AC power bus for each of the multiple phases of the AC current based on a plurality of factors, the controller having a processor and tangible, non-transitory memory on which instructions are recorded;
wherein the plurality of factors includes an oil flow rate of the motor oil and a coolant flow rate of the inverter coolant; and
wherein the controller is adapted to control operation of the vehicle based in part on a highest one of the estimated temperatures of the multiple phases.

* * * * *